(12) United States Patent
Murray

(10) Patent No.: US 12,530,137 B2
(45) Date of Patent: Jan. 20, 2026

(54) EFFECTIVELY IN-PLACE ENCRYPTION SYSTEM FOR ENCRYPTING SYSTEM/ROOT/OPERATING SYSTEM (OS) PARTITIONS AND USER DATA PARTITIONS

(71) Applicant: Zettaset, Inc., Mountain View, CA (US)

(72) Inventor: Eric A. Murray, Los Gatos, CA (US)

(73) Assignee: CYBER CASTLE, INC., Wilmington, DE (US)

( * ) Notice: Subject to any disclaimer, the term of this patent is extended or adjusted under 35 U.S.C. 154(b) by 611 days.

(21) Appl. No.: 18/086,435

(22) Filed: Dec. 21, 2022

(65) Prior Publication Data

US 2023/0350583 A1 Nov. 2, 2023

Related U.S. Application Data

(60) Provisional application No. 63/293,530, filed on Dec. 23, 2021.

(51) Int. Cl.
*G06F 3/06* (2006.01)
*G06F 21/60* (2013.01)
(Continued)

(52) U.S. Cl.
CPC .......... *G06F 3/0623* (2013.01); *G06F 3/0644* (2013.01); *G06F 3/0673* (2013.01);
(Continued)

(58) Field of Classification Search
CPC .... G06F 3/0623; G06F 3/0644; G06F 3/0673; G06F 21/602; G06F 21/62; G06F 21/78; G06F 2221/2107; G06F 2221/6218
See application file for complete search history.

(56) References Cited

U.S. PATENT DOCUMENTS 8,782,403 B1 * 7/2014 Satish ................. H04L 63/0435
726/1
2012/0151223 A1 * 6/2012 Conde Marques .........................
G06F 21/6218
713/193

(Continued)

OTHER PUBLICATIONS

Bauer, "LUKS In-Place Conversion Tool", Website/webpages (http://www.johannes-bauer.com/linux/luksipc), May 19, 2016, pp. 1-7, Johannes Bauer, Boblingen, Germany.
SourceForge, "Migrating from TrueCrypt to BitLocker", Sourceforge.net (http://truecrypt.sourceforge.net), Feb. 9, 2021, pp. 1-6, Sourceforge.net, San Diego, CA, USA.
UBUNTU, "An Enterprise-Class Cryptographic Filesystem For Linux", UBUNTU Man pages (manpages.ubuntu.com/manpages/hirsute/en/man7/ecryptfs.7.html), Feb. 24, 2021, pp. 1-6, Canonical Ltd., London, UK.
(Continued)

*Primary Examiner* — Jung W Kim
*Assistant Examiner* — James P Moles
(74) *Attorney, Agent, or Firm* — Asif Ghias

(57) ABSTRACT

Techniques are taught for encrypting one or more target partitions effectively "in-place". This effectively in-place encryption is extremely desirable when a root/OS partition (such as /, /usr, /bin, etc.) needs to be encrypted without having to manually back up its contents to another location where they may be exposed in plaintext form, encrypting a new partition, and restoring the contents back to it. The techniques of the present disclosure are also applicable for encrypting effectively in-place user data partitions. To accomplish its objectives, the technology provides an install sequence/process and a modified boot sequence to automatically encrypt partitions effectively in-place. In various embodiments, the selection of copy partitions where copy data is temporarily stored in encrypted form, is performed manually or automatically. In other embodiments, a logical volume manager (LVM) is employed that greatly facilitates provisioning of free space in the system where copy data will be temporarily and securely held/stored.

21 Claims, 13 Drawing Sheets

(51) Int. Cl.
  *G06F 21/62* (2013.01)
  *G06F 21/78* (2013.01)
(52) U.S. Cl.
  CPC ............ *G06F 21/602* (2013.01); *G06F 21/62* (2013.01); *G06F 21/78* (2013.01); *G06F 2221/2107* (2013.01)

(56) References Cited

U.S. PATENT DOCUMENTS

| | | | |
|---|---|---|---|
| 2014/0047244 A1* | 2/2014 | Buswell | G06F 21/6281 713/190 |
| 2017/0230179 A1* | 8/2017 | Mannan | H04L 9/3226 |
| 2019/0074967 A1 | 3/2019 | Stuntebeck et al. | |

OTHER PUBLICATIONS

Wikipedia, "BitLocker", Wikipedia page (https://en.wikipedia.org/wiki/BitLocker), Jun. 25, 2021, pp. 1-6, Wikimedia Foundation, Washington D.C., USA.

Wikipedia, "TrueCrypt", Wikipedia page (https://en.wikipedia.org/wiki/TrueCrypt), Nov. 10, 2019, pp. 1-7, Wikimedia Foundation, Washington D.C., USA.

Wikipedia, "XFS", Wikipedia page (https://en.wikipedia.org/wiki/Wikipedia), Dec. 3, 2021, pp. 1-10, Wikimedia Foundation, Washington D.C., USA.

* cited by examiner

EFFECTIVELY IN-PLACE ENCRYPTION SYSTEM FOR ENCRYPTING SYSTEM/ROOT/OPERATING SYSTEM (OS) PARTITIONS AND USER DATA PARTITIONS

RELATED APPLICATIONS

This application claims priority from U.S. Provisional Patent Application No. 63/293,530 filed on Dec. 23, 2021 and which is incorporated by reference herein for all purposes in its entirety.

FIELD OF THE INVENTION

This invention generally relates to the field of cryptography and more specifically to encrypting data "in-place" on a root/OS or user data partition.

BACKGROUND

Since data is a most valuable possession of any enterprise, great care is typically taken for protecting it. Various methods of data protection are usually employed. These include encryption, obfuscation, network and user activity monitoring to name a few.

In as far as encryption is concerned, there is often the need to encrypt an unencrypted root partition of a disk drive of a computer system containing operating system (OS) or related system data. Traditional solutions require manually backing up the data existing on the root partition, encrypting the root partition, and then restoring the data back on the encrypted partition. This requires a reboot of the system to an administrator's console and terminating any other users or processes from the system. This also often requires booting from a different/secondary boot device or drive. Such a scheme is very laborious/manually-intensive, error-prone, inefficient, and operationally prohibitive in a multi-user and/or mission-critical environment.

Further explained, it is often desirable to encrypt the root (/) and other operating system partition(s) such as (/usr, /var, /bin, etc. in a Linux/Unix environment) in addition to encrypting user data or application data partitions. Setting up partition-based encryption requires destroying the existing filesystem and creating a new encrypted one in its place. In the traditional art, encrypting an existing data partition requires shutting down any processes using the partition. Exemplarily, such a partition may be containing a database or any other software/programs that are in use and stored on the partition. The above step of shutting down the partition in the prevailing art is following by manually backing up the partition, wiping the old plaintext data on the partition, creating a new encrypted partition, and copying the data back on/onto it, now in its encrypted form.

For root/OS partition(s) this is problematic because in a normal multi-user mode, the OS is using the root/OS partitions. As such, the partitions cannot be automatically wiped out and recreated while in use. The prior art for encrypting the root partition of computer systems or encrypting data "in-place" in general, is lacking. Ecryptfs, is a file-based system which is fundamentally different from partition-based system of the above discussion. Truecrypt was a loopback type block device encryption system. The user would create a file in their filesystem which acted as the backing store of the Truecrypt volume. The Truecrypt volume appears as an additional partition (as a drive in Windows). The system did not have the ability to encrypt in-place and is no longer supported.

In general, file-based encryption schemes that can encrypt files in-place still require the new encrypted partition to be mounted and all processes switched from using the old partition to the new partition. This is problematic in a multi-user environment. Further, file-based encryption schemes are less efficient than partition-based encryption schemes.

LuksIPC is an open-source project that is no longer supported. It could encrypt a Linux® Unified Key Setup (LUKS) encrypted partition in-place, provided that the filesystem on it can be shrunk. This is needed to obtain space on the block device for the LUKS header which is customarily in the first few blocks of the device. Furthermore, the system had bugs and was not operationally reliable. Currently the most common Linux® filesystem is XFS™ which cannot be shrunk. LuksIPC is also very slow, and also requires the filesystem to be unmounted so that other processes/users cannot write onto it while it is being shrunk and encrypted. Any other encrypt-in-place scheme that depends on the filesystem being shrunk before encryption would also not work for XFS.

Bitlocker™ for Microsoft Windows™ is a partition-based system. It allows encryption of existing root/OS partitions. However, the initial encryption works by setting up and rebooting the computer system. Once the system is back up, the disk blocks are not yet encrypted. The filesystem driver starts encrypting blocks one by one. This is done while the machine is in use. However, the encryption is slow, taking hours, days or even longer. And during the time that the encryption is being performed, blocks of the data still remain in their plaintext form and are vulnerable to attacks. Furthermore, the solution requires significant modifications to the device driver.

FIG. 1 shows a conceptual view 10 of a prior art system containing an unencrypted/non-encrypted filesystem 6 on an unencrypted disk partition 4 on an underlying physical storage 2. Notice, that filesystem 6 is created directly above block device 4 without any encryption. As a result, all data residing in filesystem 6, whether user data or system/OS/root data is in its plaintext or unencrypted form.

What is needed is a root/OS/system partition or a user data partition encryption system that does not require a manual backup/restore of the data and does not require the size of the data or operating system filesystem on the partition to be shrunk. What is also desired and unavailable in the prior art is an encryption system that is fast and efficient ideally requiring only a few minutes for encrypting more than 1 Gigabytes (GB) partition with current CPU speeds.

OBJECTS OF THE INVENTION

In view of the shortcomings of the prior art, it is an object of the invention to provide techniques for an in-place encryption system that does not require a manual backup/restore of the data while it is being encrypted.

It is also an object of the invention to provide such an in-place encryption system for encrypting system/root/Operation System (OS) partitions of the system.

If is further an object of the invention for the above in-place encryption system to not require the filesystem on the system/root/OS partition to be shrunk.

It is also an object of the invention to extend the techniques of the in-place encryption system to encrypt any other data partitions and not just the root/OS partition, including user/application data partitions.

It is further an object of the invention for efficiently executing its in-place encryption technology such that a partition of more than 1 GB could ideally be encrypted in a few minutes or less with contemporary CPU speeds.

Still other objects and advantages of the invention will become apparent upon reading the summary and the detailed description in conjunction with the drawing figures.

SUMMARY OF THE INVENTION

A number of objects and advantages of the invention are achieved by apparatus and methods for an effectively in-place encryption system comprising a number of data partitions, or more just simply partitions. These partitions may be system/root/OS partitions containing system, root or OS data. They may also be user data partitions or simply user partitions containing user or application data.

The partition that is to be encrypted is referred to as the target partition and existing useful data on the target partition that needs to be preserved while it is being encrypted is referred to as its copy data. Thus, the copy data may be system data on a root partition or user data on a user partition.

For encrypting the target partition, a suitable partition on the system other than the target partition itself is identified. A suitable partition is one that has enough free space to hold the copy data when the target partition will be encrypted. Such a suitable partition is referred to as a copy partition based on the instant principles.

The copy partition for the target partition being encrypted is automatically identified by a free space analysis code or tool or module which analyzes the disk usage of/on all data partitions in the system. Alternatively, the copy partition is manually identified or designated by an administrator. The administrator may also override the copy partition automatically identified by the analysis code/module.

The identification or configuration information of the target partition and its corresponding copy partition are entered into a configuration file, as a target partition entry. In a preferred embodiment, the configuration information of the corresponding copy partition is only entered if an admin manually specifies/designates the copy partition. Otherwise, the copy partition is left blank, and this signals to the boot code to automatically discover a suitable copy partition per below teachings.

In either scenario, after a system reboot, the modified boot sequence/code of the instant design iterates over the entries stored in the configuration file. For each target partition to be encrypted, its corresponding copy partition is located. The copy partition may have been specified/designated by the admin in a config file. A check is performed to ensure that the specified copy partition has enough free space for the copy data.

If not, an error is logged and the system is booted with the target partition unencrypted. After a review of the error log, the admin specifies a different suitable copy partition and the boot sequence is retried.

Alternatively to logging the error and booting the system with unencrypted target partition, the admin is prompted to specify another suitable copy partition during the boot sequence. The newly specified copy partition is still checked for sufficient free space and the above process is repeated.

If no copy partition was specified in the config file, or if the specified copy partition has insufficient free space, a suitable copy partition is automatically selected/detected/discovered from the available data partitions as that partition that has sufficient free disk space to hold the copy data while the target partition is encrypted. This is accomplished by utilizing a free space analysis code/module of the present design.

Once a valid/suitable copy partition is located, instant boot code then creates a backing file on the copy partition. It then creates a loopback block device (or a loopback device for short) with the backing file. It then encrypts the loopback block device with a symmetric encryption key that it generates randomly and locally. This is a temporary key and is referred to as a copy key. The copy key is retained just in the memory and is never written to permanent storage such as a disk. As a result, an encrypted loopback block device created with/using the backing file is obtained.

As a next step, the modified boot code/sequence creates a filesystem on the encrypted loopback block device, thus obtaining an encrypted loopback filesystem. The encrypted loopback filesystem on the encrypted loopback block device created above is also referred to as a copy filesystem and is a temporary filesystem for holding the copy data.

In a preferred embodiment, the tasks of creating a loopback block device, encrypting it and then creating the final encrypted loopback copy filesystem on it, are combined into one or more steps. This is done, for example, by utilizing the commands available in Linux® Unified Key Setup (LUKS). Next, the instant code copies or backs up the copy data onto the copy filesystem. It then erases/deletes the copy data on the target partition and optionally zeroes it or wipes it clean.

Instant boot code then obtains a symmetric encryption key from a key manager (KM) and encrypts the target partition with it. Of course, it does so only after properly authenticating to/with the KM. Preferably, this target encryption key as well as the copy key above wraps/encrypts respective data keys that are transparently used for the actual encryption/decryption.

After the target partition has been encrypted, instant modified boot code restores or copies the copy data from the copy filesystem onto the newly encrypted target partition. It then deletes the copy filesystem with the underlying encrypted loopback block device and the backing file. It further forgets/deletes the copy key from the memory. This makes the encrypted copy data unreadable. As a result, it is not necessary to secure erase it, or to overwrite it with dummy data such as zeros for ensuring that no plaintext copy data blocks are left in the system.

Based on the instant principles, the above process is repeated/iterated-over for all target partitions entered into the configuration file that are to be encrypted. The target partition that is encrypted in the current iteration may be used as a copy partition for another unencrypted target partition in a following iteration.

In such a scenario, the encrypted loopback block device created on the already encrypted partition, advantageously re-encrypts or double-encrypts the copy data since the underlying partition is already encrypted. The above arrangement endows a standardized design to the instant effectively in-place encryption system, whether the underlying copy partition is already encrypted or not.

In a set of highly preferred embodiments, the copy data on the copy partition is optionally also compressed before it is written in order to reduce the free space requirement on the copy partition for holding the copy data. For this purpose, any suitable compression algorithm available in the industry may be utilized.

A set of highly preferred embodiments employ a logical volume manager (LVM). The advantage of these LVM-embodiments is that they can work even in situations when there is no single partition with enough free space available for temporarily holding the copy data of a given target partition being encrypted. As a consequence of the present LVM-embodiments, it is less likely that there will not be enough free space in the system for the list of target partitions to be encrypted.

In these LVM-embodiments, for each target partition to be encrypted, the analysis code/module identifies those partitions in the system other than the target partition itself, that have a combined/collective free storage space large enough to hold the copy data. In these embodiments, these partitions are collectively referred to as copy partitions. The administrator may also manually identify or designate such copy partitions in a manner analogous to the prior embodiments.

As in prior embodiments, the identification/configuration information for the target partition and the corresponding copy partitions is stored in a configuration file. This may be done at install time. Then after a system reboot, the modified boot sequence of the present embodiments locates the copy partitions and checks to see if collectively they still have enough free space for the copy data. If not, alternate copy partitions are identified, automatically or manually in a manner analogous to the prior embodiments.

The instant modified boot sequence/code then creates a backing file on each of the copy partitions. It then creates a loopback block device on/with each of the backing files. In one variation of the present LVM-embodiments, the boot code then encrypts these loopback block devices with locally and randomly generated, respective symmetric temporary encryption keys to obtain respective encrypted loopback block devices. The keys of the copy partitions above are again referred to as copy keys. They are temporary and only kept in memory. The boot code then initializes these encrypted loopback block devices as respective physical volumes (PVs).

The modified boot sequence/code of the present embodiments then utilizes a logical volume manager (LVM) to create a volume group (VG) on the PVs obtained above. It then creates a logical volume (LV) on the VG. It then creates a filesystem on the VG. This copy filesystem is encrypted because the underlying block devices are encrypted per above.

Next, the boot code backs up the copy data of the target partition onto the copy filesystem. It then encrypts the target partition with a symmetric key that it obtains from a KM after authenticating to it. It then restores the copy data from the copy filesystem onto the newly encrypted target partition. Now, the encrypted target partition may be included in the VG for the target partition to be encrypted in the next iteration.

In an alternative set of variations of the present LVM-embodiments, the loopback block devices created with the backing files on respective copy partitions are not encrypted per above. Instead, the boot code initializes these loopback devices/mounts as physical volumes (PVs). In contrast to the previous variation of the LVM-embodiments, these loopback devices/mounts of the PVs can be unencrypted (if their underlying partitions are unencrypted).

The boot code then creates a VG on the PVs as before. It then creates an LV on the VG also as before. The code then encrypts the block device provided by this LV using a locally and randomly generated copy key. Subsequently, it creates a filesystem on it, and which is an encrypted filesystem because the underlying LV is encrypted per above. Hence, this variation requires only one encryption operation, i.e., of the LV (or equivalently stated, of the overlying filesystem) and only one copy key.

Moreover, this filesystem is a regular filesystem and does not need to be a loopback filesystem, because it is created on the encrypted block device presented by the LV. As before, once the current target partition is encrypted, it can then be included in the VG and LV to provide copy storage/store for the next target partition to be encrypted.

In various embodiments, the very action of creating a new encrypted filesystem on the target partition deletes any existing copy data. Hence, a separate delete operation is not required or specified. Alternatively, the copy data is explicitly deleted before encrypting the target partition. In any scenario, the copy data may also be optionally wiped or zeroed for enhanced security. As noted above, the action of deleting the copy key makes zeroing/wiping out the copy data from the copy partition unnecessary.

As in the prior embodiments, in the present LVM-embodiments also, the copy data on the copy filesystem is optionally compressed before it is written in order to reduce the free space requirement on the copy partitions for holding the copy data. For this purpose, any suitable compression algorithm available in the art may be utilized.

In other variations, a key manager may not be or needed/used at all, and all keys are thus locally generated. Of these, only the target partition keys are saved to permanent storage as they are needed to decrypt the target partition after system reboot.

In highly preferred implementations, the installer code is based on the Ansible suite of software tools. In such preferred implementations, there are two configuration files. The first configuration is used to store the target partition entries as before, and configuration information of any corresponding copy partition(s) if specified.

In these embodiments, the automatic analysis code is only run when there is no copy partition information specified by the admin in the first configuration file. The second configuration file is generated by the installer and contains the target partition entries, the key ids for keys for encrypting target partitions, and optionally config information of any copy partition(s)—only if specified by the admin in the first configuration file.

In these preferred implementations, the automatic analysis code is run at boot time only when no partition information has been specified by the admin in the first config file for a target partition to be encrypted. These preferred implementations take advantage of pre-existing software configuration/provisioning tools, including but not limited to Ansible.

Clearly, the system and methods of the invention find many advantageous embodiments. The details of the invention, including its preferred embodiments, are presented in the below detailed description with reference to the appended drawing figures.

BRIEF DESCRIPTION OF THE DRAWING FIGURES

DETAILED DESCRIPTION

Figure 1:
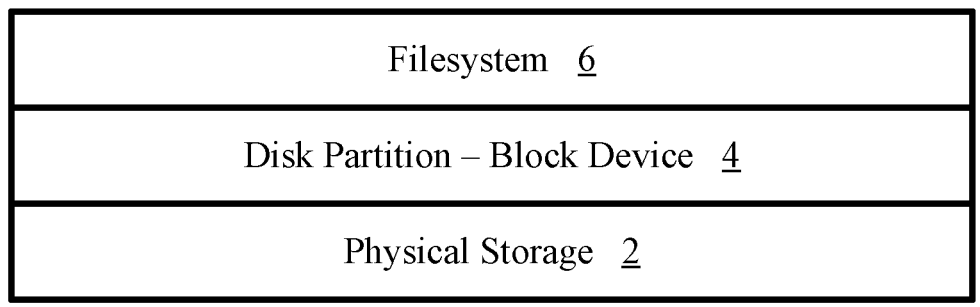
FIG. 1 shows a conceptual diagram of a prior art system containing an unencrypted filesystem created on top of a disk partition created on a physical storage device, such as a disk drive.

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Let us now review the "effectively in-place" encryption system of the present design in great detail. We refer to the present technology as effectively in-place rather than just in-place, because while the instant solution does require a backup and subsequent restore of the data, it does so automatically, and without the inefficiencies and the requisite manual interventions of the prior art. The data partitions referred to herein that can be encrypted by the instant effectively in-place encryption system may be root or Operation System (OS) partitions containing root or OS or system data. They may also be user data partitions or simply user partitions containing user-level or application-level data (or simply user data).

Thus, it is to be understood that while the effectively in-place encryption technology of the present design is particularly suited for encrypting existing root or operating system (OS) partition(s), it is also just as applicable for encrypting any other data partitions containing user or application, or any other data. Therefore, while the teachings provided herein may generally refer to a target data partition (or simply a target partition) to be encrypted as being a system/root/OS partition containing root/OS-related data (or simply root data), the same techniques are extendable for encrypting other data partition(s) containing user-related (or simply user data or application data).

Furthermore, since the following teachings are applicable for each target partition to be encrypted, in order to facilitate explanation, we shall review these steps for encrypting a single target partition. We will do so while knowing that the same techniques can be repeatedly applied to all other target partitions to be encrypted also.

It is also meant to be understood by a personal of ordinary skill in the art (POSA) that a computer system, such as the instant effectively in-place encryption system, would comprise a physical data storage or simply physical storage. The physical storage may consist of one or more storage devices, either local to the computer system or connected to it by a network. The storage devices may be any storage devices, including data disk drives or simply disk drives containing hard/soft disks, solid state drives/devices, optical storage drives/devices, compact-disk (CD) read-only memory (ROM) drives/devices, magnetic tapes, etc.

A skilled artisan will further understand that a data partition, or simply a partition as referred to herein, is a logical unit of data storage created or configured on a storage device, from amongst the available storage devices, including the ones listed above. Exemplarily, a partition may be created/configured on a Linux/Unix operating system (OS) with a command such as fdisk, or the like. On other OSes this may be accomplished by equivalent commands/user-interface widgets available on those respective OSes. As such, in order to facilitate explanation, this disclosure will take advantage of specifying exemplary Linux commands for performing various operations. This is done with the knowledge that equivalent commands on other OSes may be utilized within the scope of the current principles.

The partitions mentioned herein may exist or be created/configured on one or more storage devices configured in or connected to the instant effectively in-place encryption computer system or more simply the instant effectively in-place encryption system. Of course, more than one partitions may be created on or exist on a single storage device or a single partition may span multiple storage devices, such as in a redundant array of disks (RAID) configuration.

Figure 2:
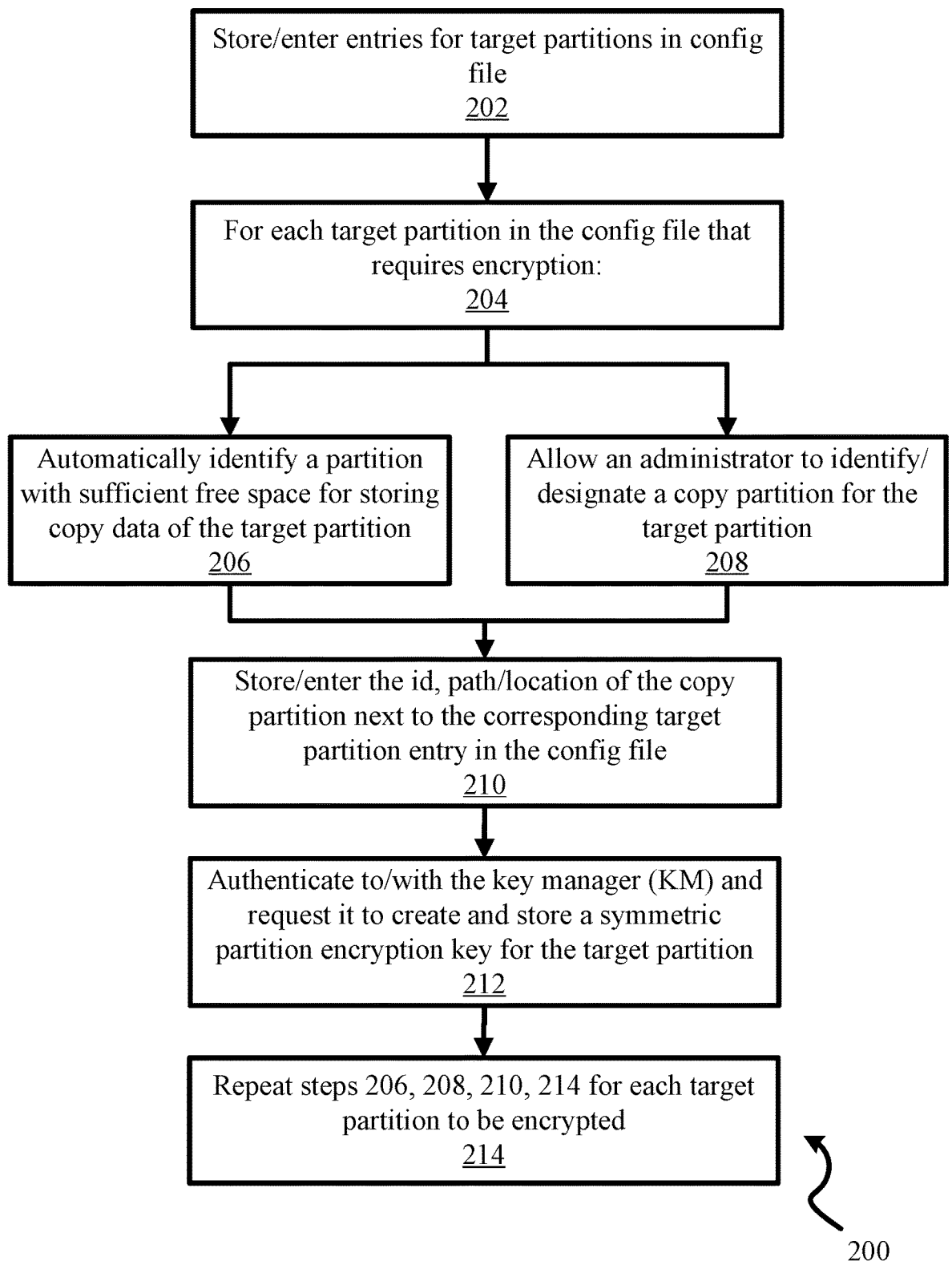
FIG. 2 shows in a flowchart or a flow diagram form the steps executed by the installation sequence/code of the present design.

Armed with the above understanding, let us now first review the installation process or sequence of the present technology in conjunction with the flowchart or flow diagram 200 of FIG. 2. Not all the detailed steps explained in the below teachings of this disclosure are necessarily illustrated in corresponding flowcharts for the sake of brevity, and for the clarity of drawings.

Installation:

Based on the instant principles, the present design includes an installation configuration file, or simply a configuration file, that stores or records the device names or ids and paths and any other requisite configuration parameters of those partitions that are to be encrypted. We refer to such partitions as target partitions and the data they contain as copy data that needs to be preserved.

This copy data is initially unencrypted or in plaintext form, but becomes encrypted when the target partition is encrypted. While in some situations below, a target partition may already be encrypted, of particular interest is a target partition that needs to be encrypted. We will refer to such an unencrypted target partition with unencrypted copy data as simply a target partition, drawing its distinction from an encrypted target partition with encrypted data only when and if needed.

Exemplarily, the installation configuration file introduced above, contains information about the target partitions, including their device ids, paths, mount points, mount parameters, etc. The instant install/installation program code saves the above information as configuration entries for each respective target partition in the configuration file.

Alternatively, another software or interface may be responsible for inputting and editing the above configuration information about the target partitions into the configuration file, either programmatically/automatically or manually by an administrator. This first step of storing target partition configuration entries in the configuration file is depicted by step 202 in FIG. 2.

Per above, first the configuration file is created and the configuration information about target partition(s) is stored in it. The installation program code or script then iterates over each target partition configuration entry in the file and checks to see if the corresponding target partition is already encrypted. A target partition may have been previously encrypted by the instant technology or by another encryption system.

If a target partition is already encrypted, a message is shown to the administrator stating that as such. On the other hand, if a target partition is unencrypted then the program flow can proceed in one of two ways. This loop for iterating over all target partitions entered in the config file that require encryption is shown by box 204 in flowchart 200 of FIG. 2.

In one preferred embodiment, as shown by box/step 206, for each target partition to be encrypted, the install code automatically analyzes the free space and more specifically the disk usage of or on all other partitions of the system in order to identify a suitable copy partition. Here, we refer to a copy partition as a partition in the system that has enough free space to temporarily hold the copy data of its corresponding target partition while the target partition is being encrypted.

The analysis of free/available storage space in the instant effectively in-place encryption system is performed by an analysis code which preferably is a part of the installation program code. Alternatively, this analysis may be performed by an free space analysis module operating in conjunction with the installation code/sequence. In either case, the free space or disk usage analysis preferably may utilize a command such as df or the like.

Instead of or in addition to the automatic code above, and as shown by box/step 208, an administrator may also manually identify or designate a copy partition during this install time for each target partition to be encrypted. If the partition identified/designated by the administrator is not large enough to hold the copy data of the target partition, then an error message/exception is thrown, informing the administrator as such, and asking for another copy partition large enough to be identified/designated.

Whether the copy partition for a target partition to be encrypted is automatically or manually identified by per above, its id, path or location or any requisite configuration information is stored in the above-discussed configuration file. This is shown by step/box 210 in FIG. 2. This information about the copy partition is preferably entered next to or by or alongside the entry containing the configuration information of the corresponding target partition in the configuration file. These entries are preferably called target partition entries.

Now, data operations may be performed on the copy partitions during the course of operation of the system in the time intervening the install and boot times. Therefore, it is possible that a copy partition that had large enough free space to hold copy data for the target partition at install time, no longer has enough free space at boot time, when the target partition is actually supposed be encrypted per below teachings.

If that is the case, then at boot time, a different partition is either automatically chosen by the above-described automatic analysis or alternatively, by an administrator. Note that conversely, it is also possible that a copy partition that had insufficient free space at install time, has sufficient free space to hold copy data for one or more target partitions at boot time.

As stated above, the automatic analysis of disk usage is performed by an automatic free space analysis code or module of the instant design. This automatic code/module scans the list of partitions in the system and automatically identifies the partitions with sufficient free space for each target partition to be encrypted. If no such copy partition exists for a target partition, an error is shown/thrown. In LVM embodiments discussed further below, the automatic code is expanded to look for free space on not just a single partition but on a combination of all available partitions in the system other than the target partition currently being encrypted.

Based on the above, the instant automatic free-space analysis code may run at both install and boot times. Alternatively, it may be run just at boot time. This is because the amount of free space available on a copy partition for a target partition, needs to be checked at boot time regardless of whether it was checked at install time. In other words, in one scenario occurring at boot time, for a given target partition, a copy partition may be identified by the automatic code. In another scenario occurring at install time, the copy partition may have been previously automatically identified, or manually identified and recorded by the administrator in the install config file.

In either scenario, a check still needs to be performed at boot time to ensure that the copy partition has sufficient free space to hold the copy data of its target partition. This is because the amount of free space available on the identified/designated copy partition may have been changed between install time and boot time per above. If there is insufficient free space in the designated copy partition to hold the copy data of the target partition being encrypted at boot time, then a different copy partition is identified or selected automatically by the automatic code, or alternatively identified/designated by the administrator.

In any event, let us assume that there are one or more target partitions to be encrypted and there is at least one copy partition that has sufficient free space to hold the copy data for a target partition to be encrypted. The configuration of one of such suitable copy partitions is entered into the configuration file next to the corresponding target partition information, as a target partition entry.

In this scenario, the instant install code then authenticates itself to a key manager (KM) or key server preferably via digital certificates. Upon successful authentication, it requests the key manager/server to create and store a symmetric partition encryption key, or simply a partition key, for the target partition to be encrypted. This is shown by step/box 212 of FIG. 2. Steps, 206-212 are then repeated for each target partition to be encrypted as shown by box 214.

The instant install code then modifies the boot sequence or boot process of the system per below explanation. In one embodiment of the present effectively in-place encryption system, the install code requests the KM to create and store partition keys for all target partitions to be encrypted. In this way, a partition key for the corresponding target partition is always available to the modified boot sequence below, whether or not there is a suitable copy partition available for the target partition. In order to economize on key creation/storage however, in an alternative embodiment it is the modified boot sequence that requests the KM to create and store a partition key. It does so only when it has ascertained that a suitable copy partition is available for the target partition at boot time.

Once the system is booted, the modified boot sequence of the present design is instantiated. In this modified boot sequence, the target partition(s) that is/are scheduled for encryption but not encrypted yet are encrypted before the Operating System (OS) uses them. The following steps are performed for each such target partition.

Figure 3:
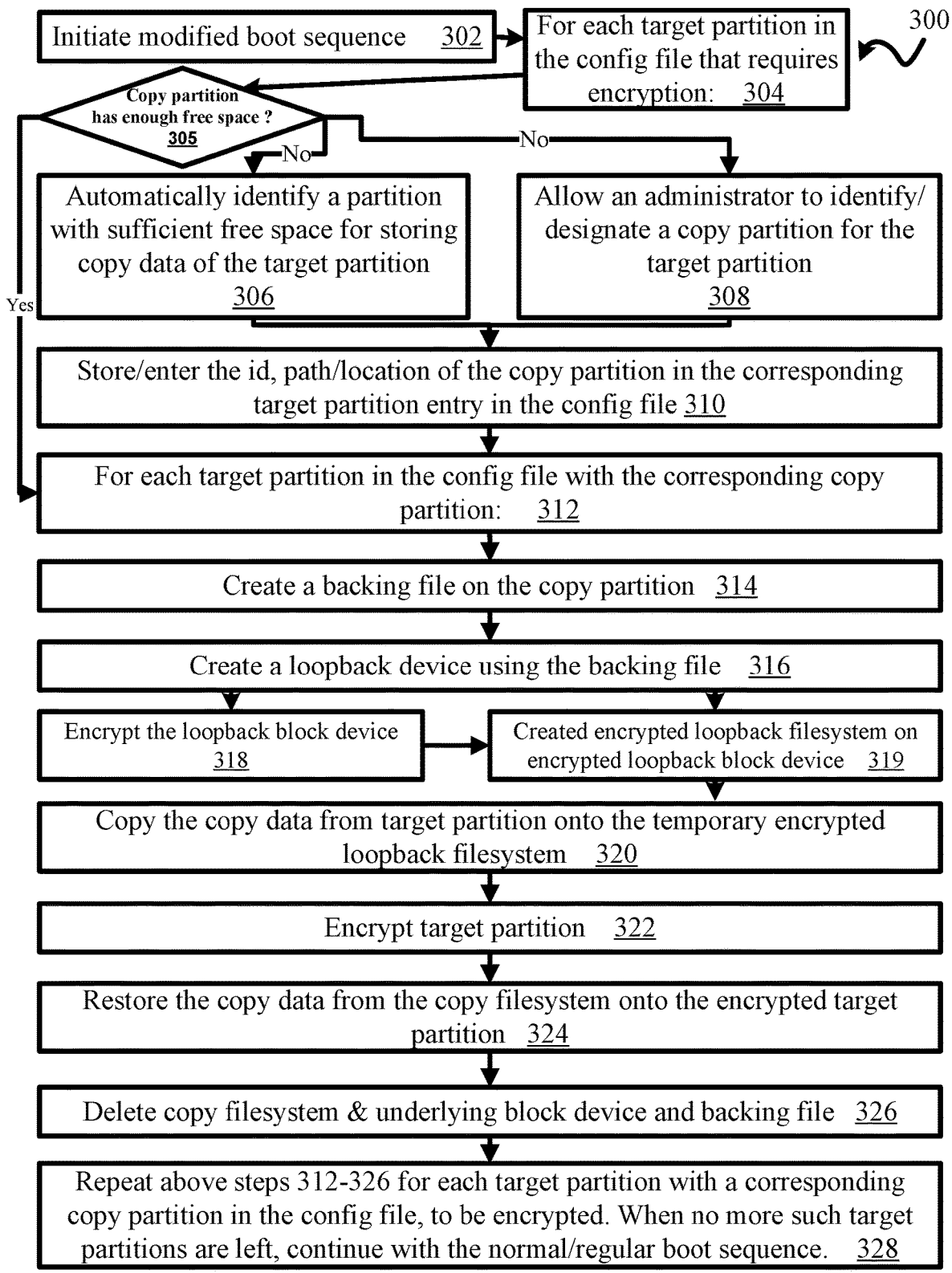
FIG. 3 shows in a flowchart or a flow diagram form the steps executed by a modified boot sequence/code of the present design.

Modified Boot Sequence:

Let us now review the modified boot sequence of the present design in conjunction with flowchart 300 of FIG. 3. Again, not all the steps taught below are necessarily illustrated in FIG. 3 for brevity and clarity of the drawing.

The modified boot sequence includes the setup code/sequence/steps for setting up the target partition(s). The setup code will be discussed in great detail below. In the modified boot process, during the "pre-mount" single-user mode/stage of the boot sequence, the instant modified boot sequence program code first enables networking in order to communicate with the key manager. The pre-mount phase of the boot is referred to as the stage when no storage devices have been mounted yet. This boot stage is for administrators only and often only allows a single administrator user in a single-user mode.

The modified boot sequence is initiated by typically restarting/rebooting the system and per step 302 of flowchart 300. As shown by box/step 304, the modified boot sequence then iterates over target partition entries of the install configuration file discussed above. For each target partition configured during the installation/install time in the configuration file described above, the instant modified boot code first checks to see if the target partition is already encrypted.

If it is, the instant boot code then authenticates itself to the key manager (KM) preferably via a digital certificate which is preferably an X.509 certificate. Alternatively, the boot code authenticates itself to/with the KM via another suitable authentication technique known in the art. However, if the boot code had already authenticated itself during a prior iteration i.e., for the encryption of another target partition, then the authentication step is optionally skipped.

Upon successful authentication, the instant boot program code requests and retrieves the partition key from the KM for the encrypted target partition. It then unlocks the encrypted target partition with the partition key and mounts the target partition for normal use by the OS. Processing for this already encrypted target partition thus concludes at this point.

By unlocking a partition, we mean that the partition key of the partition has been entered/applied and henceforth the data on the partition can be decrypted and accessed. The unlocking is performed by running an appropriate unlocking command that usually precedes a mount command. Each partition key is a symmetric key and preferably transparently wraps a corresponding symmetric data key, and which is the key that is actually used to encrypt/decrypt data on the partition.

The process of applying the partition key to access the data key happens transparently. When the partition is in use, the data key is stored in the kernel, and more specifically in its data structure referred to as a key ring. Encryption/decryption is performed by an encrypt-decrypt device driver of the encrypted partition or the block device. The encrypt-decrypt device driver accesses the kernel's key ring to obtain the data key for the partition and encrypts/decrypts data on/from it as it is written/read to/from the encrypted target partition, transparently to the user.

After describing partition unlocking and subsequent encryption/decryption, let us now return to the instant modified boot sequence initiated above. The modified boot sequence iterates the following steps for each target partition that is not encrypted. This is shown by box 304 of FIG. 3. For each such target partition, the boot sequence checks to see if the identified/designated copy partition stored in the configuration file has sufficient free space. This check is shown by decision diamond 305 and may utilize a command such as df or the like.

If the copy partition does not have sufficient free space, likely because of intervening data operations between installation and booting per above, then steps 306, 308 and 310 are performed in a manner analogous to respective steps 206, 208 and 210 of FIG. 2. More specifically in this case, either a copy partition is automatically identified (step 306) or manually identified (step 308) and in both cases, its configuration entered in the configuration file (step 310).

Recall that each target partition that is to be encrypted requires a copy partition in which to hold a temporary copy of its data, referred to as its copy data. The copy partition, also generally referred to as copy storage or copy store, comprises a copy directory containing a backing file for temporarily holding the target partition's copy data in encrypted form per below teachings. For convenience, the same name and path of the copy directory is used for holding the backing file in all/most other copy partitions and across differing environments where the instant technology is deployed.

As noted, it is this copy directory where the backing file to be discussed further below is created. In various embodiments, the identification of the copy partition with enough free storage is done manually (steps 208/308) or preferably, automatically (step 206/306). This identification is done either both at install time (flowchart 200) and/or at boot time (flowchart 300) as noted above.

Now, as shown by box 312 of flowchart 300, for each target partition that is not encrypted and has a corresponding copy partition identified, the modified boot sequence of flowchart 300 runs its setup code/steps. The setup code/sequence runs automatically and without user intervention. Such an automatic and intervention-free processing of the setup code/sequence is one of the key innovations of the present design. Let us now review this automatic setup code as shown in flowchart 300 in great detail.

Setup Steps/Code/Sequence as a Part of the Modified Boot Sequence:

1. As a first step, the setup code locates the copy partition for the target partition. The copy partition may have been recorded in a configuration file at install time or discovered automatically now at boot time. Once the copy partition is located, the setup code checks to see if a filesystem already exists on it. If it does not, then it creates a new filesystem on it (exemplarily by mkfs command or the like).

Now, the copy partition may already be encrypted either by a prior run/iteration of the present technology or by another encryption system. If the copy partition is already encrypted, the instant installation program code/script then authenticates itself to a key manager (KM) per above teachings, and obtains the partition key for the copy partition. In such a scenario, an encrypted filesystem may already be existing on the copy partition. If not, one is created. Note that we refer to a filesystem on an encrypted partition or an encrypted block storage device as an encrypted filesystem because it exists on an underlying encrypted partition or device.

2. Next, a large enough file to temporarily hold the copy data of the target partition is created on the filesystem on the copy partition, and more specifically in a uniformly named copy directory created on it. This file is referred to as the backing file and may be created using an appropriate command such as dd or fallocate. This step of creating a backing file on the copy partition is shown by box 314 in FIG. 3.

3. Next, a loopback block device or a loopback device for short is created using the backing file, as depicted by step/box 316. Next, and as shown by step 318, the setup code encrypts this loopback block device with a temporary symmetric key that it generates locally. This temporary key is referred to as a copy key and is created using a random seed.

The setup code uses the copy key to encrypt the loopback block device. The copy key is a temporary key because it is only kept in the systems memory and never written to a static storage such as disk for enhanced security. Transparently, the copy key further preferably wraps a data key and that data key is actually used to encrypt/decrypt data on the temporary/temp/ copy encrypted loopback filesystem created above. From here onwards, we may skip this step of the transparent use of a wrapped data key while discussing encryption steps in the below explanation for the sake of brevity. Such wrapping of the actual data key is not a requirement but highly recommended.

As a consequence of encryption, the loopback block device is referred to as an encrypted loopback block device. Next, a filesystem is created on it as shown by step 319 and this filesystem is referred to as an encrypted loopback filesystem since it is created on an encrypted loopback block device. This encrypted loopback filesystem is also referred to as the copy filesystem because it is meant to temporarily store the copy data.

The advantage of having an encrypted filesystem for temporarily storing the copy data of the target partition is that no blocks of the data will ever be written to the disk in plaintext form that may potentially be discoverable/decipherable. Once the encrypted temporary storage comprising the copy filesystem is setup per step 319, it is ready for the copy data from the target partition to be copied/backed-up to it.

In a preferred variation, one or more of steps 316, 318 and 319 are combined into one or more composite operations. Such operations are oftentimes possible using an appropriate underlying system, such as Linux® Unified Key Setup (LUKS).

4. Now, the backing up or copying of copy data is shown by step 320 of flowchart 300. Step 320 may preferably be done by an appropriate command such as cp or dd or tar or cpio or the like. The copy data on the target partition or the entire target partition can then be optionally wiped clean or zeroed before it is encrypted. This may be done by an appropriate command such as wipe or shred or scrub or dd, etc.

5. Next, the target partition is encrypted, as shown by step 322. For this purpose, the setup code obtains the partition key from the KM for the target partition. This partition key for the target partition was created and stored by the key manager in response to a request by either the install code or the modified boot sequence per above. Of course, the setup code obtains the partition key only after authenticating with/to the KM. Once again, transparently, the partition key preferably wraps a data key that is actually used for encryption/decryption as in the case of copy key of the copy filesystem created on the copy partition above.

6. Now, since setup code is preferably a component of the instant modified boot sequence, the authentication would have been already performed above and is not needed again. On the other hand, if the setup code is operating in a separate system/module, then its authentication with the KM needs to be performed. Regardless, setup code next creates a new filesystem on the encrypted target partition and which is an encrypted filesystem.

In many OSes, the above operation of creating a new filesystem will also delete any existing data on the underlying target partition. It that is not the case, then any existing copy data is first explicitly deleted before the target partition is encrypted.

7. Next, the copy data belonging to the target partition and now residing in the temporary/backup loopback filesystem, is copied back or restored onto the newly created encrypted filesystem on the target partition. This is shown by step 324. Again, as the data is written/restored by an appropriate command, such as cp, dd or tar or the like. The encrypt-decrypt device driver transparently encrypts the copy data with the data key as it writes it to the encrypted filesystem per above teachings.

8. After the restore, the temporary copy filesystem is deleted and its randomly generated symmetric copy key along with its data key are deleted/forgotten from the memory. As a result, the underlying encrypted loopback block device and the backing file created above are deleted. These actions are shown by step 326 in flowchart 300. Based on the instant design, there is no mechanism to access the data of the target partition, except by using the partition key of the newly created encrypted target partition with its new encrypted filesystem per above.

9. Next, the new encrypted filesystem is mounted and the boot process continues. Now, as shown by box 328, if there are anymore target partitions to be encrypted, the above steps 314-326 are repeated for them. Otherwise, the original boot sequence of the system is followed to boot the system up for regular multi-user operation. For the sake of efficiency, the target partition that was just encrypted is left unlocked and mounted, so it can be used as a copy partition for the target partition to be encrypted in the next iteration.

As mentioned, the above setup code/sequence is performed automatically and without user intervention. This is a key advantage of the present technology. Furthermore, the above design also allows an administrator to intervene in the modified boot sequence if needed. The instant design further allows the administrator to manually identify or designate or select different copy partitions for the target partitions. These may be instead of or in addition to those identified automatically by the instant analysis tool/code/module during the install and/or boot processes.

The administrator also has the option of overriding a copy partition that was automatically identified. In an important use-case of the present design, when there is not enough free space available in the system, the admin connects a temporary external drive with enough free space and uses that as a copy partition, by specifying its information in the configuration file.

Figure 4A:
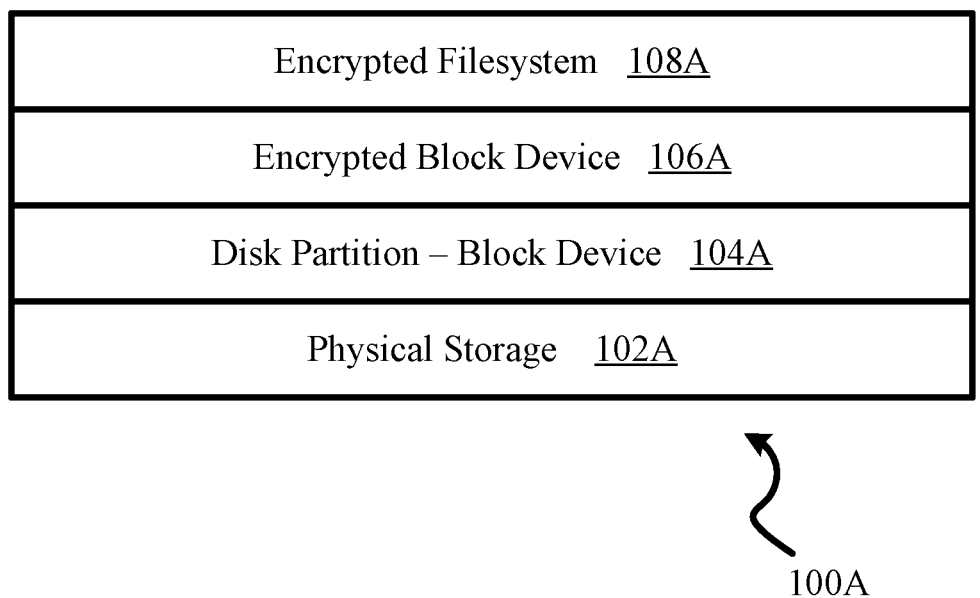
FIG. 4A shows the storage layers of an encrypted target partition that is encrypted using the present technology, and in contrast to the prior art conceptual diagram of FIG. 1.
Figure 4B:
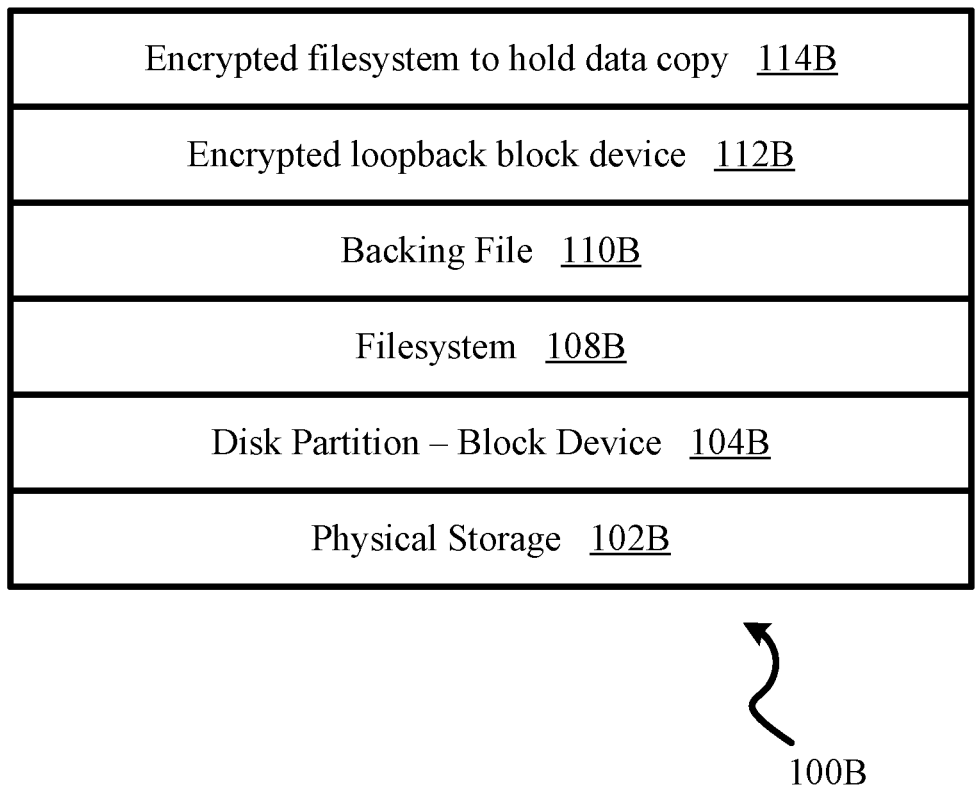
FIG. 4B shows the layers of storage of a copy partition while achieving the state presented in FIG. 4A.
Figure 4C:
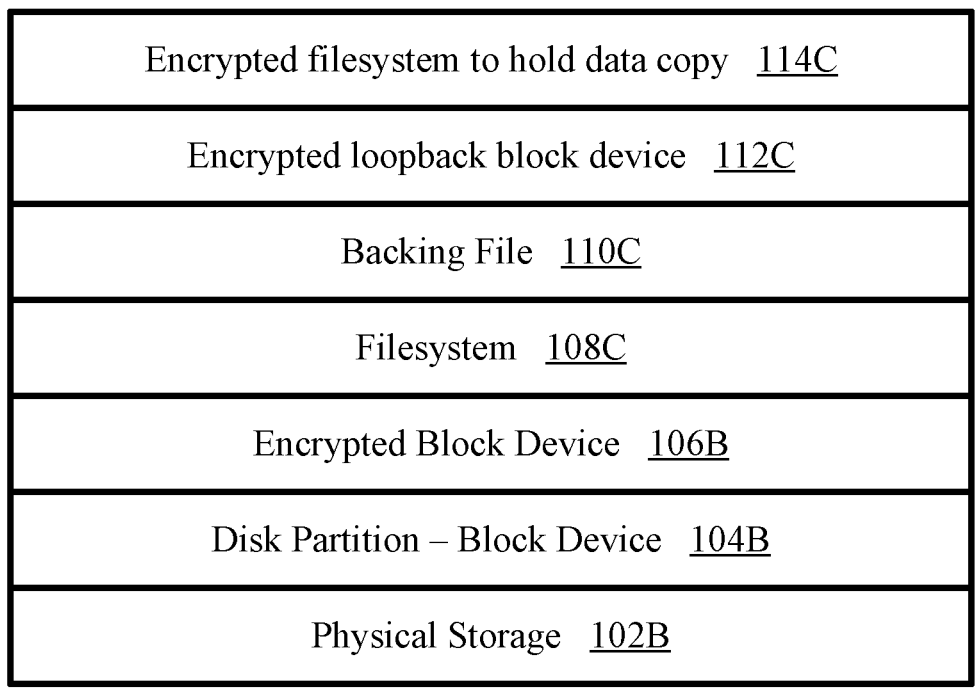
FIG. 4C is a variation of FIG. 4B when the underlying block device of the copy partition is already encrypted, such as by a prior iteration of the instant system.
Figure 4C:

Let us now review an exemplary operation/execution/run of the present technology with the aid of FIG. 4A-C. FIG. 4A shows a conceptual view 100A with the storage layers of an encrypted target partition that is encrypted using the present technology. In contrast to the prior art system 10 of FIG. 1 explained in the Background section, notice the encrypted block device 106A created above the lower-level block device 104A over physical storage 102A. All these layers are underneath the overlying encrypted filesystem 108A of the newly encrypted target partition. Encrypted block device 106A belongs to the encrypted target partition (exemplarily a root/OS partition: "/"). This is after the copying/restoring of its copy data from its corresponding copy partition to its newly encrypted block device or the newly created encrypted filesystem, has been completed.

FIG. 4B shows a conceptual view 100B with layers of storage of a copy partition while achieving the state presented in FIG. 4A. In other words, FIG. 4B shows copy filesystem 114B which is an encrypted (loopback) filesystem at the top layer. It is created on top of an encrypted loopback block device 112B of the above discussion. The encrypted loopback block device 112B itself is created with a backing file 110B in filesystem 108B. This intermediate state showing the copy partition exists while the target partition is being encrypted. In this scenario, encrypted filesystem 114B created on loopback block device 112B will hold the copy data for the target partition.

Backing file 110B is originally created in filesystem 108B on a copy partition that is not encrypted. However, the backing file is then encrypted using a randomly generated key, while presenting itself as encrypted loopback block device 112B per above. Note however, that if filesystem 108B (and its underlying partition 104B), on which backing file 110B created originally was already encrypted, then it is re-encrypted by encrypted loopback block device 112B of above explanation. This situation is shown in FIG. 4C.

Explained further, FIG. 4C shows a variation of FIG. 4B where another partition (exemplarily a user data partition or simply a user partition: "/home") is being encrypted after the root (/) has already been encrypted per above. However, now the copy partition for/home exists on block device 106B that is already encrypted. Layer 106B represents a block device containing root/OS data that was previously encrypted, or any other target partition that has already been encrypted per FIG. 4A and associated explanation above.

In FIG. 4C, backing file 110C is created on a partition that is already encrypted. Then an encrypted loopback block device 112C is created with backing file 110C. Therefore, in actuality, encrypted loopback block device 112C with overlying encrypted filesystem 114C re-encrypts the data in backing file 110C because its underlying block device 106B was already encrypted in the prior iteration above. Now encrypted filesystem 114C can hold the copy data for the current partition (e.g. /home) being encrypted.

As discussed in reference to FIG. 4A, backing file 110C of FIG. 4C can also be created on an unencrypted partition. This is because the loopback device with overlying filesystem created on it, will be encrypted anyway. As such, the data residing in the backing file i.e., in its loopback block device and filesystem, will be encrypted regardless.

In a highly preferred implementation of the above embodiments, the installer code is based on the Ansible suite of software tools. In such a preferred implementation, there are two configuration files. The first configuration file or inventory file, preferably named as hosts.inv file, is used to by the installer to create a boot image and to generate a second configuration file. The second configuration file is preferably named as cryptinitab file.

The admin only edits the first configuration file or the hosts.inv file to enter the configuration entries for the target partitions to be encrypted. For any target partition entry, if the admin desires to manually specify/designate a copy partition, he/she enters the configuration information of the copy partition next/along/by the target partition entry in the hosts.inv file. Otherwise, the admin does not enter any copy partition information for the target partition, i.e. leaves the copy information blank.

The above functionality of the present preferred embodiments is similar to the prior embodiments. However, once the Ansible installer of the present design is run, it generates the boot image for booting the system and a respective cryptinitab file. For each target partition entry in the hosts.inv file, the installer requests the KM to create the corresponding keys of for the target partitions to be encrypted.

Now, as a part of generating the second configuration file or the cryptinitab file, the installer writes the key ids of the keys created by the KM in the cryptinittab file. It writes the key ids next to the target partition entries in the cryptinittab file that will be used for encrypting the respective target partitions during the boot time. If there was a copy partition for a target partition specified by the admin in the hosts.inv file, the configuration information for that copy partition is also written by the installer in the cryptinittab file next/along to/with the respective target partition entry.

The modified boot sequence for the present preferred embodiments follows analogous steps as in the prior embodiments. However, unlike the prior embodiments, for each target partition entry in the cryptinittab file, the disk usage analysis tool/module is only run only for those target partitions for which no copy partition information exists in the cryptinittab file. In other words, the automatic free space analysis tool/module is only run for those target partitions for which the admin had not manually specified any copy partition.

Thus, in the modified boot sequence of the present embodiments, for each target partition in the cryptinittab file, a suitable copy partition is identified/located, either manually (based on admin's inputs in hosts.inv file at install time), or automatically (by the analysis tool at boot time). After the copy partition is located, the rest of the processing of the present embodiments is analogous as in prior embodiments, and as per FIG. 3 and associated explanation. More specifically, in reference to FIG. 3, the check of decision diamond 305 is still performed to ensure that the copy partition has enough free space. If not, one of boxes/steps 306 or alternatively 308 are performed.

However, in the present embodiments, the copy partition information/configuration is preferably not entered into the cryptinittab file at boot time. The copy partition is just simply used per steps 312-328 of FIG. 3, and without preferably requiring step 310. Further, in step 322, the setup code of the present embodiments uses the key id stored in the cryptinittab file per above, and uses that to retrieve the key for encrypting the target partition. As before, the key above is preferably a wrapping key that wraps/encrypts a data key.

In a set of preferred variation of the all of the above embodiments, the copy data on the copy partition is optionally compressed before it is written in order to reduce the free space requirement on the copy partition for holding the copy data. Any suitable compression algorithm available in the industry may be utilized for this purpose.

Embodiments Employing a Logical Volume Manager (LVM):

A set of highly preferred embodiments employ a logical volume manager (LVM). The advantage of these LVM-embodiments is that they can work even in situations when there is no single partition with enough free space to temporarily hold the copy data of a given target partition is available. As a result, it is less likely that there will not be enough free space in the system for the list of target partitions to be encrypted. Let us now review the functionality of these LVM-embodiments in greater detail.

Figure 5:
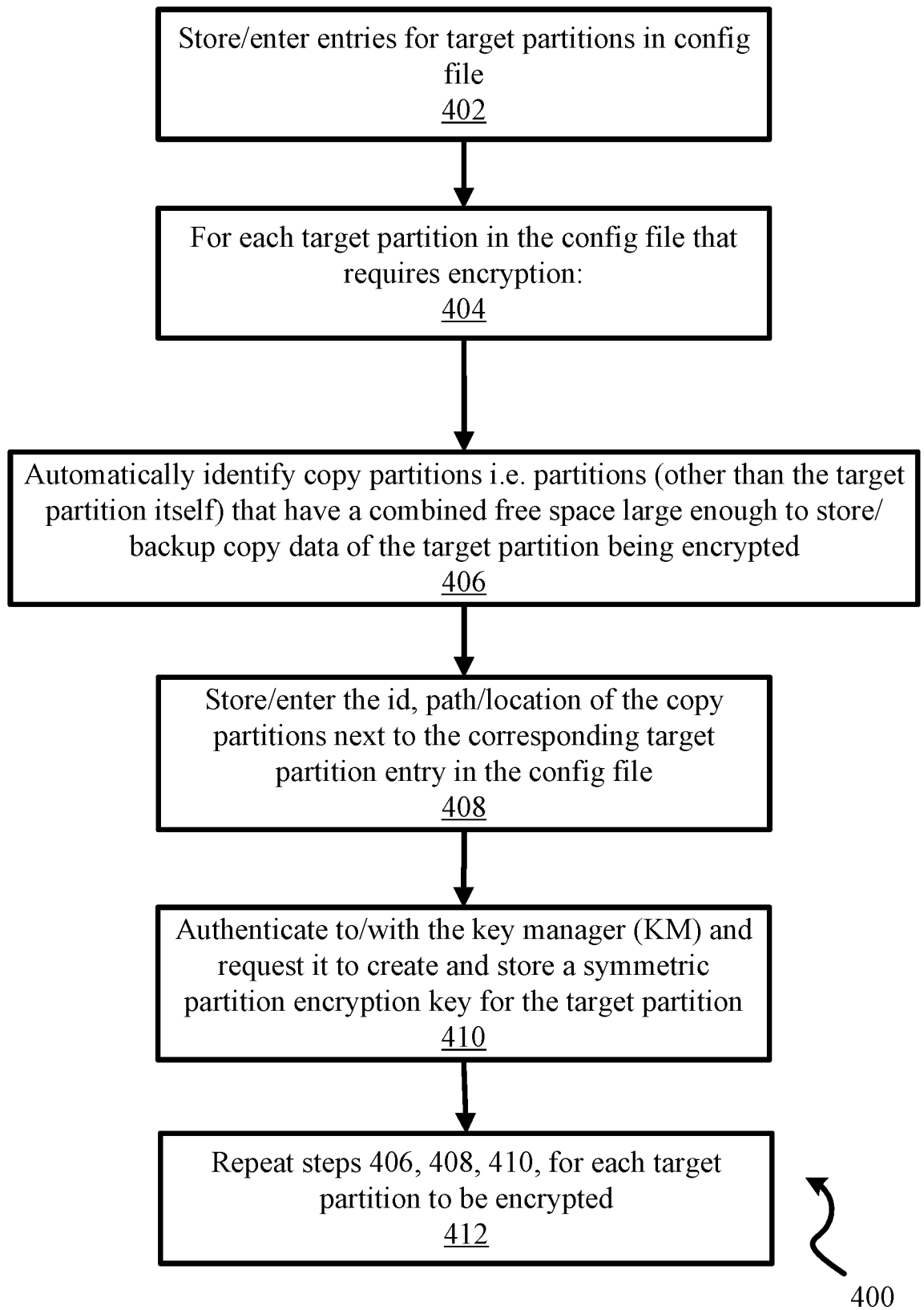
FIG. 5 shows in a flowchart or a flow diagram form the steps executed by the installation sequence/code of the logical volume manager (LVM)-embodiments of the present design.

The installation/install sequence of the present LVM-embodiments is shown in flowchart 400 of FIG. 5. It is instructive to compare flowchart 400 of FIG. 5 of the present LVM-embodiments with flowchart 200 of FIG. 2 of the prior embodiments. At install time, the first step 402 is to store or enter the target partition entries in the config file, either programmatically or manually by an administrator.

Then, and as shown by step 404, for each unencrypted target partition entry in the config file, the automatic analysis code of the present embodiments is executed. The instant automatic analysis code/module checks to see if the combined/collective free space on all other partitions (i.e., partitions other than the target partition itself, referred to herein as the copy partitions) is large enough to hold the copy data of the current target partition being encrypted. This step is shown by box 406.

As shown by step 408, the id/path or location or any other configuration information of such copy partitions identified above, is stored in the target partition entries in the config file. If there is insufficient free space collectively on the copy partitions to hold the copy data of the target partition, then an error message is shown/thrown indicating that there is not enough free space in the system, and that the target partition will not be encrypted.

Otherwise, as in prior embodiments, and as shown by box 410, the install code authenticates to the key manager (KM) and requests it to create a symmetric partition key for the target partition that will be encrypted. Steps, 406-410 are then repeated for each target partition to be encrypted as shown box 412.

Figure 6:
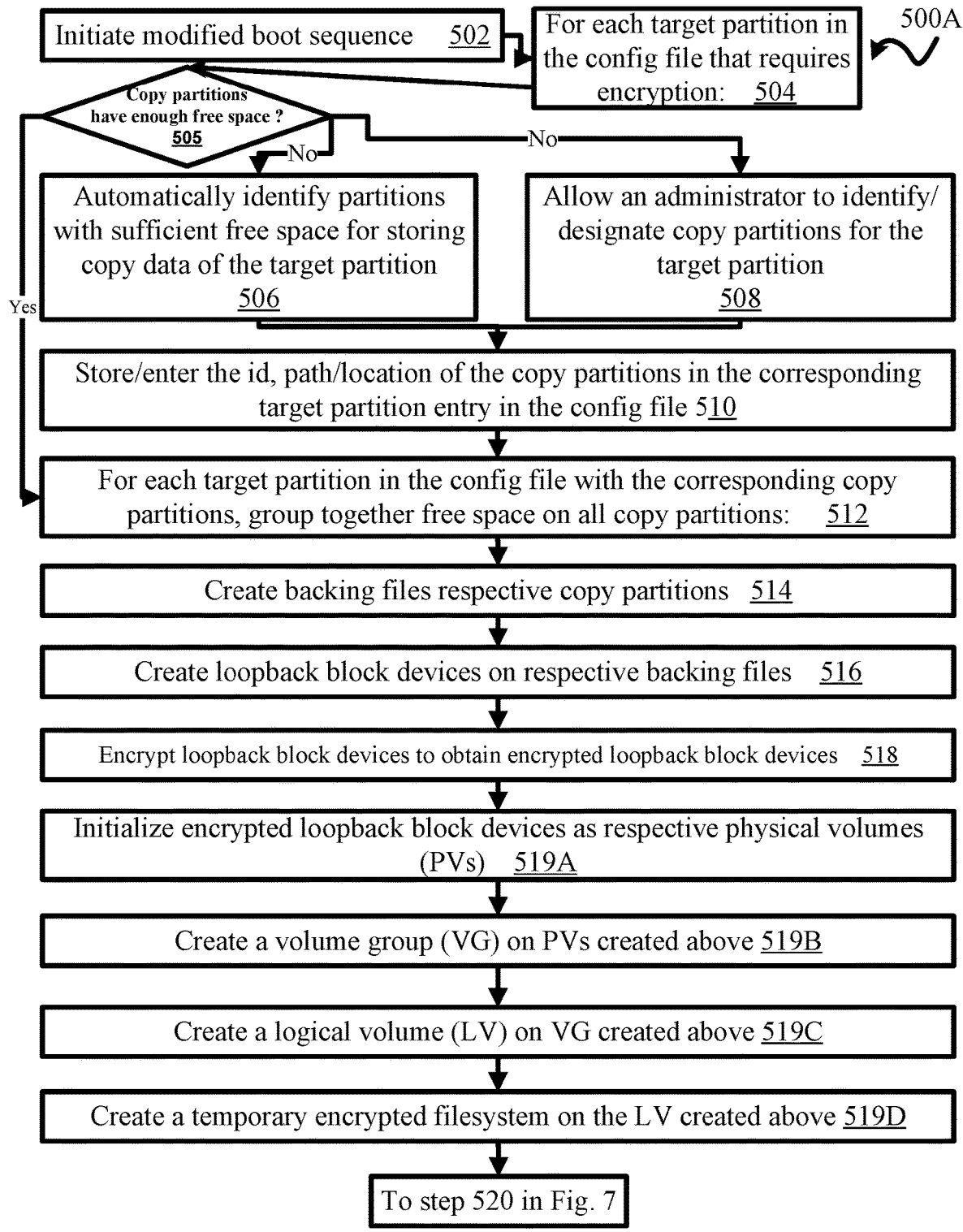
FIG. 6-7 show in flowchart or flow diagram forms the steps executed by a modified boot sequence/code of one set of variations of the LVM-embodiments of the present design.
Figure 7:
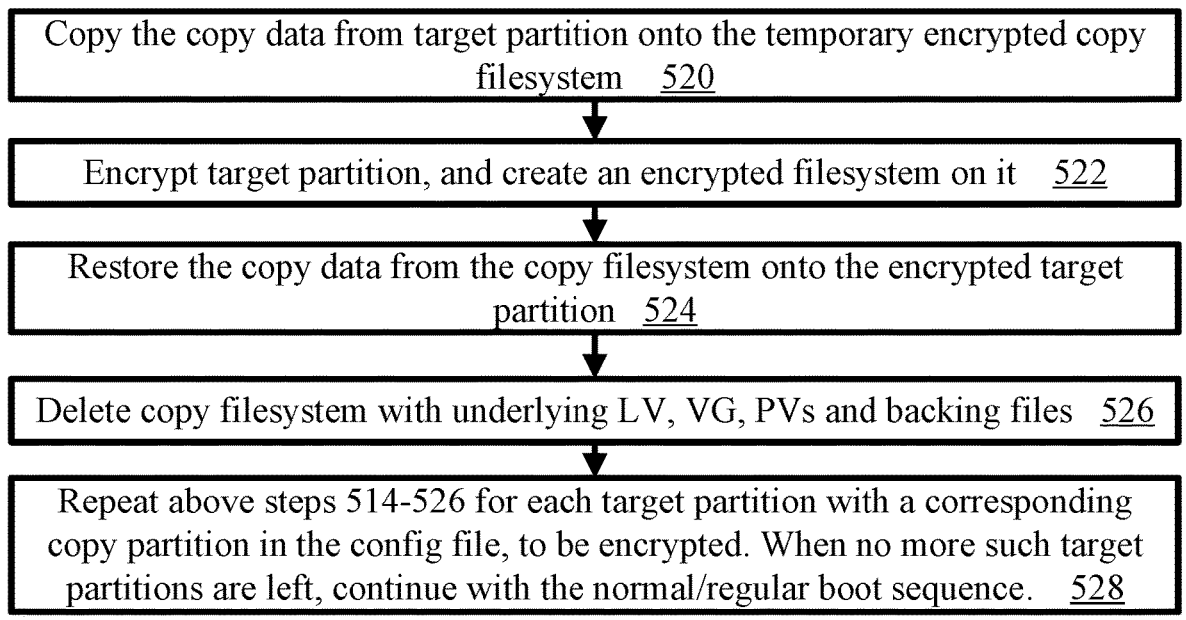

Modified Boot Sequence of LVM-Embodiments:

Now let us review the modified boot sequence of the instant LVM-embodiments with reference to flowcharts 500A and 500B of FIG. 6 and FIG. 7 respectively. Once again, it is instructive to compare flowcharts 500 of FIG. 6-7 of the present LVM-embodiments with flowchart 300 of FIG. 3 of the prior embodiments.

To begin, the instant modified boot sequence is initiated at step 502, typically by a system reboot/restart. Then, the modified boot sequence iterates over configuration entries of the install configuration file discussed above. For each target partition configured during the installation/install time in the configuration file described above, the instant modified boot code first checks to see if the target partition is already encrypted.

If it is, the instant boot code then authenticates itself to the KM preferably via a digital certificate which are preferably an X.509 certificate. Alternatively, the boot code authenticates itself to/with the key manager (KM) via another suitable authentication technique known in the art. However, if the boot code had already authenticated itself during a prior iteration i.e., for the encryption of another target partition, then the authentication step is optionally skipped.

Upon successful authentication, the instant boot program code requests and retrieves the partition key from the KM for the encrypted target partition. It then unlocks the encrypted target partition with the partition key and mounts the target partition for normal use by the OS. Processing for this already encrypted target partition thus concludes at this point.

However, the modified boot sequence iterates the following steps for each target partition that is not yet encrypted. This loop is shown by box 504 of FIG. 6. For each such target partition, the boot sequence checks to see if the corresponding copy partitions identified and stored in the configuration file collectively have sufficient free space to hold the target partition copy data. This check is shown by decision diamond 505 and may utilize a command such as df or the like.

If the copy partitions collectively do not have sufficient free space, likely because of intervening data operations between installation and booting operations per above teachings, then steps 506, 508 and 510 are performed in a manner analogous to respective steps 206, 208 and 210 of FIG. 3. More specifically in this case, either the requisite copy partition(s) are automatically identified (step 506) or manually identified/designated (step 508) and their configuration entered in the configuration file (step 510).

Now, as shown by box 512 of flowchart 500, for each target partition that is not encrypted and has corresponding copy partition(s) identified, the modified boot sequence of flowchart 500 then runs its setup code/steps. The setup code/sequence runs automatically and without user intervention. Such an automatic and intervention-free processing of the setup code/sequence is one of the key innovations of the present design. Per box 512, for each target partition to be encrypted, the logical volume manager (LVM) is used to group together the free space on all copy partitions. There are two sets of variations for accomplishing this for the present embodiments.

Let us now review the automatic setup code for the two variations of the present embodiments in conjunction with flowcharts 500A, 500B, 550A and 550B of FIG. 6, FIG. 7, FIG. 9 and FIG. 10 respectively in great detail.

Setup Steps/Code/Sequence as a Part of the Modified Boot Sequence of LVM-Embodiments:

1. In the first variation, as shown by step 514 of FIG. 7, a backing file is first created on each copy partition, excluding of course, the target partition currently being encrypted.
2. Then, as per step 516, and in a manner analogous to prior embodiments, setup code creates loopback devices on respective backing files.
3. Now, as shown by step 518, setup code encrypts the loopback block devices by locally and randomly generated respective copy keys, to obtain respective encrypted loopback block devices.
4. As shown by step 519A specific to present variations of the LVM-embodiments, the encrypted loopback block devices are now turned into or initialized as respective physical volumes (PV), exemplarily by a command such as [pvcreate <block device id>]. Then a volume group (VG) is created on those PVs using the LVM per step 519B. A logical volume (LV) is then created on the VG per step 519C. This VG is encrypted because the underlying PVs and respective encrypted loopback devices are encrypted. A filesystem is now created on it per step 519D, and which is now an encrypted filesystem because its underlying PVs are encrypted. This temporary encrypted loopback filesystem on the VG, also referred to as the copy filesystem for short, is now ready to be used for temporary storage of the copy data for the target partition being encrypted.

5. Now, as depicted by step 520 of flowchart 500B of FIG. 7, the copy data from the target partition is backed-up or copied onto the copy filesystem.
6. After the copy data has been copied/backed-up to the copy filesystem, the old target partition with its copy data is deleted and its contents optionally wiped out as in the prior embodiments. Now, as indicated by step 522 of FIG. 7 a new encrypted filesystem is created on the target partition. More specifically, the block device of the target partition is encrypted, and a new filesystem is created on the new encrypted partition. This new filesystem is an encrypted filesystem per above. This encryption is performed using the symmetric partition key that the KM was requested to create and store per step 410 of FIG. 5 above.
7. Now, per step 524, the copy data from the encrypted copy filesystem is copied/restored to the new encrypted filesystem of the new target partition.
8. At this stage, as shown by step 526, the temporary encrypted loopback filesystem with its underlying logical storage layers is destroyed. Per above, these include the LV, VG, PVs and encrypted loopback block devices.

In the preferred variation however, we delete the PV, encrypted loopback block device and the underlying backing file for only that copy partition that will become the target partition in the next iteration. In this variation, for the sake of efficiency, the PVs, encrypted loopback block devices and backing files for the remaining copy partitions can remain in-tact to be used in assembling the LV and VG for the next copy filesystem to be created. Consequently, in such a preferred variation, the copy keys of such remaining encrypted loopback block devices are also kept in the memory so that they can be reused in assembling the VG for encrypting the next target partition.

9. Now, as shown by box 528, the system is ready to encrypt the next target partition by repeating steps 514-526 for it. For this purpose, the next target partition is excluded from the PVs and the VG to be created. However, the target partition currently created and encrypted is included in the next VG to supply/provision the copy storage/store for the next target partition to be encrypted. As a result, the copy data that will be written to the already encrypted current target partition and future copy partition will be double or re-encrypted per above.

The present embodiments thus greatly alleviate the scarcity of free space while encrypting target partitions. It is to be noted that the present LVM embodiments are also applicable to the edge-case where there is only one copy partition that is large enough to hold the copy data in the LV and VG created above. In this case, the VG will consist of only one PV created on one encrypted loopback block device and a single underlying backing file.

Once again, a highly preferred implementation of the above LVM-embodiments, uses an installer code based on the Ansible suite of software tools. An analogous preferred implementation of the prior non-LVM embodiments was described above. As before, in such a preferred implementation of the present LVM-embodiments, there are two configuration files, hosts.inv and cryptinitab files. The first contains the target partition entries entered at install time.

If desired, the admin specifies copy partition information of the copy partitions that can be assembled into a copy filesystem for a given target partition in hosts.inv file per above. Otherwise, the admin leaves the copy partitions information blank or does not enter it in the hosts.inv file.

Once the installer is run, a boot image and a second configuration file or cryptinittab file is generated. As before, the installer requests the KM to create the keys for the target partitions. Also as before, the crypinittab file generated by the installer contains the target information entries and key ids for the keys that will be used to encrypt the target partitions at boot time. If specified by the admin in hosts.inv file, the cryptinittab file also contains the configuration information of the copy partitions for creating the copy filesystem.

The modified boot sequence for the present preferred embodiments follows analogous steps as in the prior embodiments. However, if no configuration information for copy partitions for a target partition to be encrypted exists in the cryptinittab file, the automatic free space analysis/discovery tool is run. This is done in order to dynamically identify suitable copy partitions with combined free disk space large enough to hold the copy data. More specifically, the automatic free space analysis tool/module is only run for those target partitions for which the admin had not manually specified any copy partitions in hosts.inv file.

Thus, in the modified boot sequence of the present embodiments, for each target partition in the cryptinittab file, suitable copy partitions are identified/located, either manually (based on admin's inputs in hosts.inv file at install time), or automatically (by the analysis tool at boot time). After the copy partitions have been located, the rest of the processing of the present embodiments is analogous as in prior embodiments, and as per FIG. 6-7 and associated explanation. More specifically, in reference to FIG. 6, the check of decision diamond 505 is still performed to ensure that the copy partitions have enough collective free space. If not, one of boxes/steps 506 or alternatively 508 are performed.

However, in the present embodiments, the copy partition information/configuration is preferably not entered into the cryptinittab file at boot time. The copy partition is just simply used per steps 512-528 of FIG. 6 and FIG. 7, and without preferably requiring step 510. Further, in step 522, the setup code of the present embodiments uses the key id stored in the cryptinittab file per above, and uses that to retrieve the key for encrypting the target partition. As before, the key above is preferably a wrapping key that wraps/encrypts a data key.

Figure 8A:
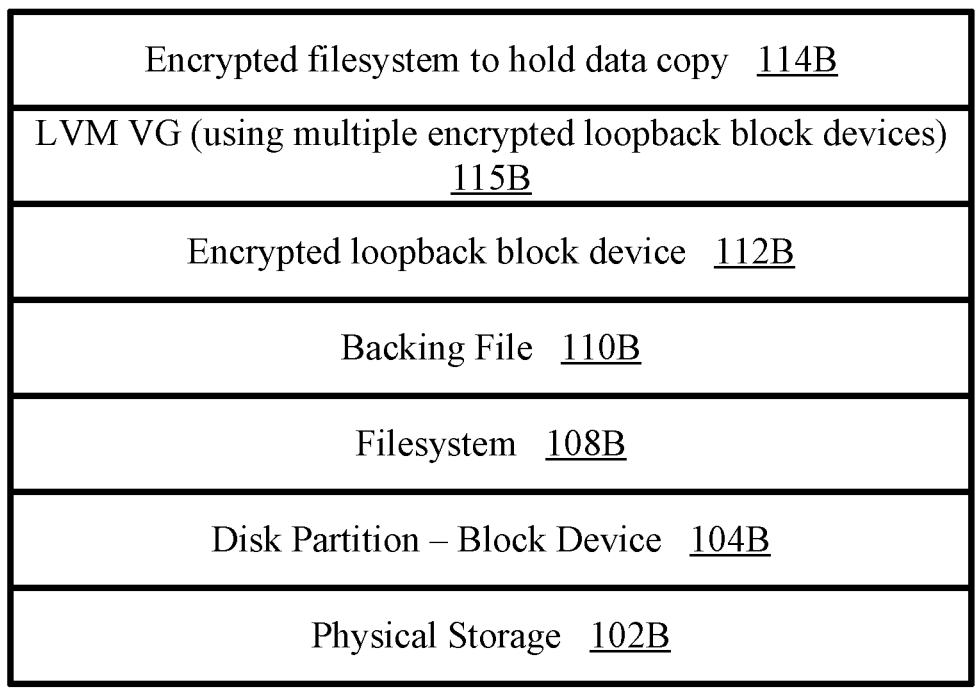
FIG. 8A is a conceptual view of various storage layers of a volume group (VG) spanning multiple encrypted loopback block devices for one set of variations of the LVM-embodiments.
Figure 8B:
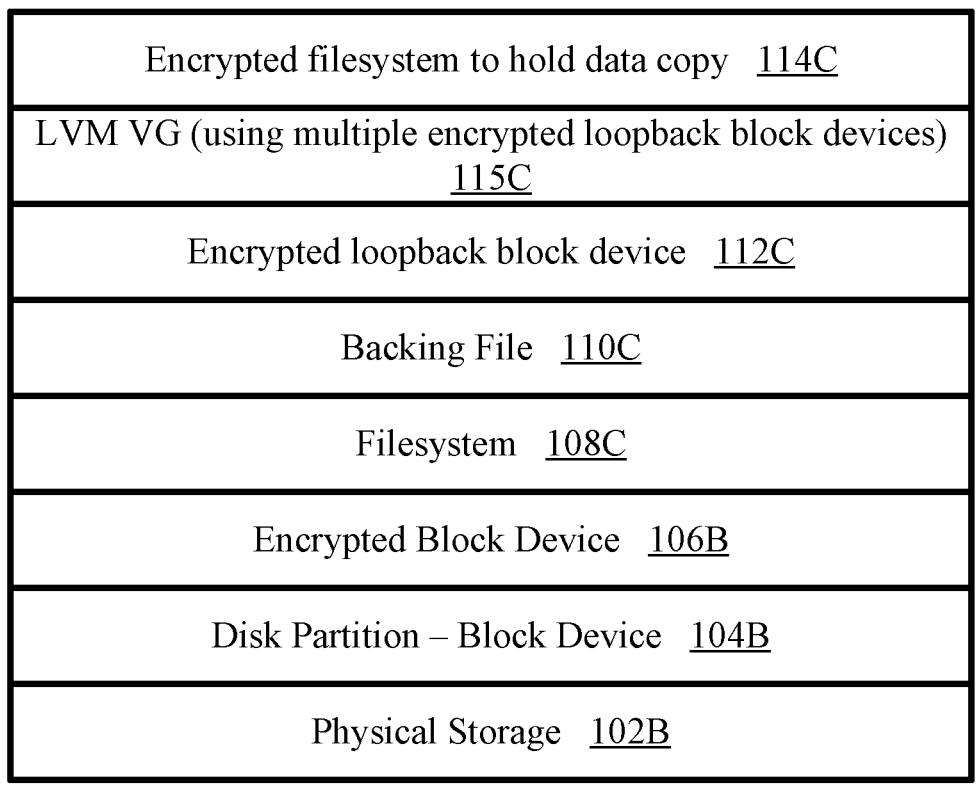
FIG. 8B is a variation of FIG. 4C and FIG. 8A, showing a storage layer 115C representing the VG spanning multiple encrypted loopback block devices of the above discussion.
Figure 9:
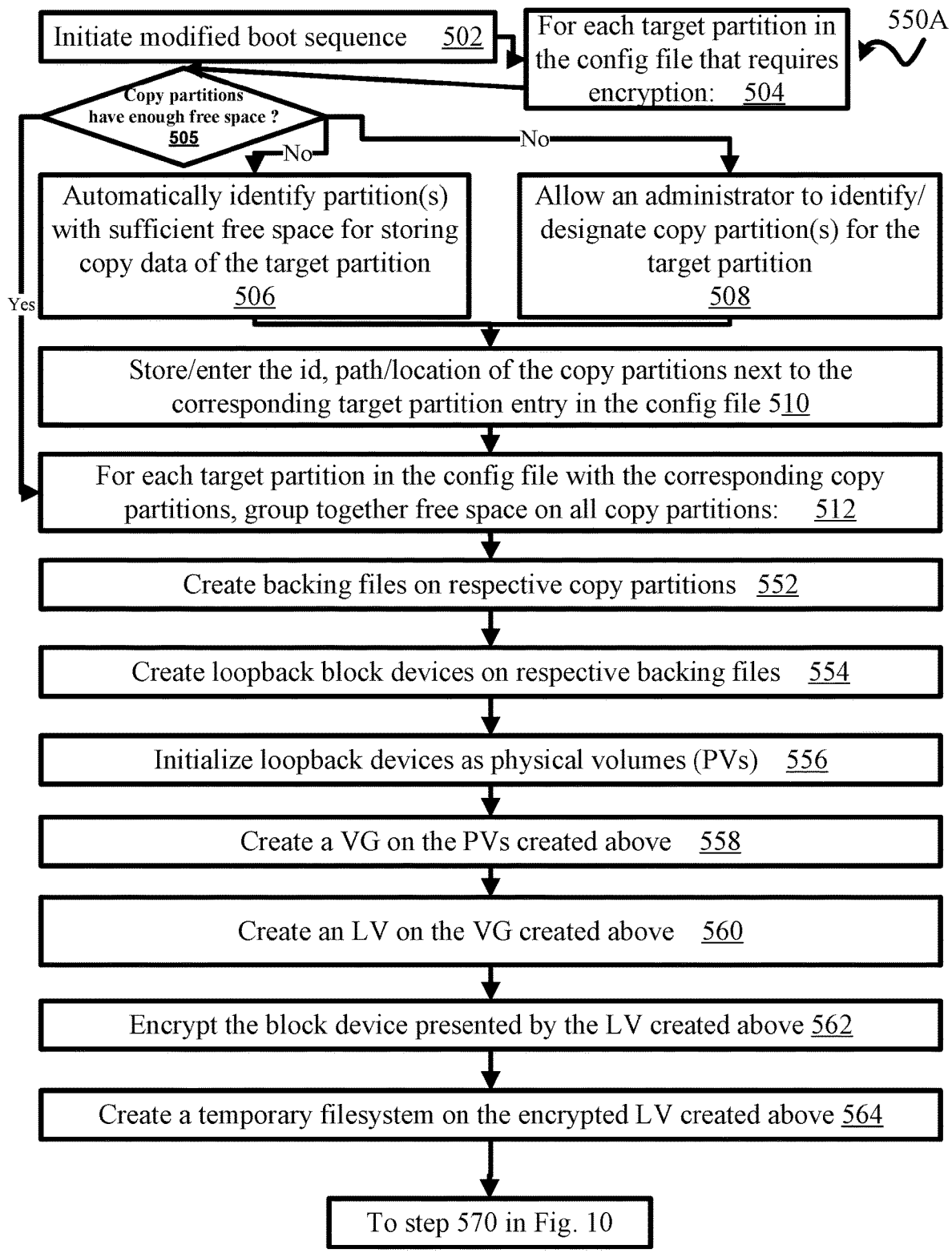
FIG. 9-10 show in flowchart or flow diagram forms the steps executed by a modified boot sequence/code of alternate variations of the LVM-embodiments of the present design.

FIG. 8A, which is a variation of FIG. 4B explained above, shows a conceptual view 100D of various storage layers for the present embodiments. As compared to FIG. 4B, FIG. 8A shows a storage layer 115B representing the VG spanning multiple encrypted loopback block devices of the above discussion. Similarly, FIG. 8B shows a conceptual view 100E as a variation of FIG. 8A and FIG. 4C explained above. As compared to FIG. 4C, conceptual view 100E has a storage layer 115C representing the VG spanning multiple encrypted loopback block devices of the above discussion.

Let us now study alternative variations of the present LVM-embodiments. For this purpose, let us take advantage of flowchart 550A of FIG. 9 and which is a variation of flowchart 500A of FIG. 6.

Many of the steps of flowchart 550A are the same as flowchart 500A. However, there are several important differences. Let us now review these in detail. In the present variation and as shown by step 554, first, loopback devices or mounts are created on the backing files of the copy partitions as before.

However, the above loopback devices/mounts are not encrypted as in the prior variations. Instead, as shown by step 556, they are initialized as physical volumes (PVs), such as by using a command like pvcreate. Thus, in contrast to the prior variations of the LVM-embodiments, the loopback devices/mounts of the PVs in the present variations are unencrypted.

Next, a volume group (VG) is created on the PVs as shown by step 558. Then an LV is created on the VG as shown by step 560. Next the setup code of the present variation encrypts the block device of this LV using a randomly and locally generated copy key as represented by step 562. Subsequently, a filesystem is created on it, and which is an encrypted filesystem. This is shown by step 564 in flowchart 550A. This filesystem is a regular filesystem and does not need to be a loopback filesystem.

Figure 10:
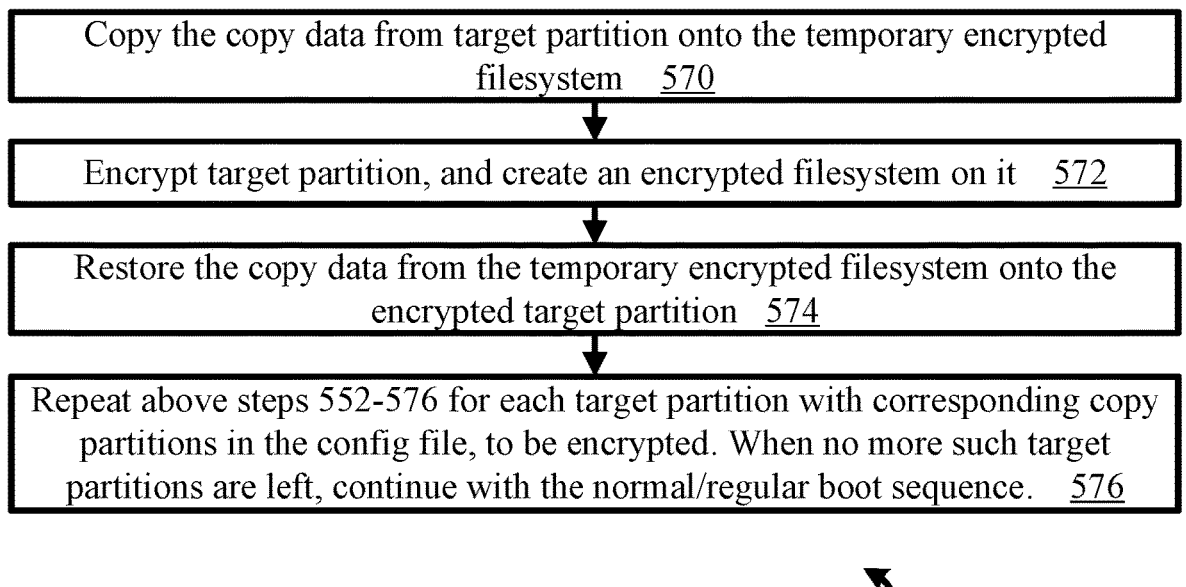
Figure 10:

Next, as shown by step 570 of flowchart 550B of FIG. 10, setup code backs up/copies the copy data from the target partition onto the temporary encrypted filesystem, or the copy filesystem, created above. Next, the target partition is encrypted, as shown by step 572 and its contents cleared/deleted/wipe as in prior variations. Now, the copy data from the copy filesystem is restored onto the encrypted target partition, as shown by step 574.

Once the current target partition has been encrypted, it may then be included in the VG and LV in the next iteration as in prior embodiments. The next LV will then be encrypted with its own copy key and will provide storage for the next target partition to be encrypted. Now, as shown by box 576, above steps 552-576 are repeated for each target partition to be encrypted. When no such target partitions remain, the normal boot sequence is resumed.

Once again, a highly preferred implementation of the present LVM-embodiments, uses an installer code based on the Ansible suite of software tools. An analogous preferred implementation of the prior LVM embodiments was described above. As before, in such a preferred implementation of the present LVM-embodiments, there are two configuration files, hosts.inv and cryptinitab files. The first contains the target partition entries entered at install time.

If desired, the admin specifies copy partition information of the copy partitions that can be assembled into a copy filesystem for a given target partition in hosts.inv file per above. Otherwise, the admin leaves the copy partitions information blank or does not enter it in the hosts.inv file.

Once the installer is run, a boot image and a second configuration file or cryptinittab file is generated. As before, the installer requests the KM to create the keys for the target partitions. Also as before, the crypinittab file generated by the installer contains the target information entries and key ids for the keys that will be used to encrypt the target partitions at boot time. If specified by the admin in hosts.inv file, the cryptinittab file also contains the configuration information of the copy partitions for creating the copy filesystem.

The modified boot sequence for the present preferred embodiments follows analogous steps as in the prior embodiments. However, if no configuration information for copy partitions for a target partition to be encrypted exists in the cryptinittab file, the automatic free space analysis/discovery tool is run. This is done in order to dynamically identify suitable copy partitions with combined free disk space large enough to hold the copy data. More specifically, the automatic free space analysis tool/module is only run for those target partitions for which the admin had not manually specified any copy partition in hosts.inv file.

Thus, in the modified boot sequence of the present embodiments, for each target partition in the cryptinittab file, suitable copy partitions are identified/located, either manually (based on admin's inputs in hosts.inv file at install time), or automatically (by the analysis tool at boot time). After the copy partitions have been located, the rest of the processing of the present embodiments is analogous as in prior embodiments, and as per FIG. 9-10 and associated explanation. More specifically, in reference to FIG. 9, the check of decision diamond 505 is still performed to ensure that the copy partitions have enough collective free space. If not, one of boxes/steps 506 or alternatively 508 are performed.

However, in the present embodiments, the copy partition information/configuration is preferably not entered into the cryptinittab file at boot time. The copy partition is just simply used per steps 512 and 552-576 of FIG. 9 and FIG. 10, and without preferably requiring step 510. Further, in step 572, the setup code of the present embodiments uses the key id stored in the cryptinittab file per above, and uses that to retrieve the key for encrypting the target partition. As before, the key above is preferably a wrapping key that wraps/encrypts a data key.

As in the prior non-LVM embodiments, in all of the above LVM-embodiments also, the copy data on the copy filesystem is optionally compressed before it is written in order to reduce the free space requirement on the copy filesystem for holding the copy data. Any suitable compression algorithm available in the industry may be utilized for this purpose.

Per above teachings, the present effectively in-place encryption technology greatly alleviates the problems of the prior art by automating encryption of partitions containing existing data. It does so very efficiently, and in part, by modifying the boot sequence/process to perform encryption before partitions are mounted for the users.

Instant technology further automates the backup and restore of data on a target partition to be encrypted using an encrypted temporary/copy store for that backup. It also performs automated identification and selection of the underlying copy partition(s) that make up the temporary copy store. For this purpose, in one set of embodiments, it uses an LV of many copy partitions together to serve as a temp/copy store, consequently greatly alleviating the scarcity of free space while performing encryption on systems containing existing data.

In view of the above teaching, a person skilled in the art will recognize that the methods of present invention can be embodied in many different ways in addition to those described without departing from the principles of the invention. Therefore, the scope of the invention should be judged in view of the appended claims and their legal equivalents.

What is claimed is:

1. An effectively in-place encryption system comprising computer-readable instructions stored in a non-transitory storage medium and at least one microprocessor coupled to said non-transitory storage medium for executing said computer-readable instructions, said effectively in-place encryption system comprising:
  (a) a plurality of data partitions on one or more storage devices;
  (b) a target partition and a copy partition belonging to said plurality of data partitions, said copy partition having free storage space large enough to store copy data of said target partition;
  (c) a backing file created on said copy partition; and
  (d) an encrypted loopback filesystem created using said backing file, wherein said encrypted loopback filesystem utilizes a symmetric key for encryption;
wherein said encrypted loopback filesystem temporarily stores said copy data while said target partition is being encrypted, and wherein said copy data is restored back onto said target partition after said target partition has been encrypted.

2. The effectively in-place encryption system of claim 1, wherein said copy data comprises one or both of operating system (OS)-related and user-related data.

3. The effectively in-place encryption system of claim 1, wherein said encrypted loopback filesystem is created on an encrypted loopback block device created using said backing file.

4. The effectively in-place encryption system of claim 1, wherein said copy partition is automatically identified by an analysis module that analyzes disk usage of said data partitions.

5. The effectively in-place encryption system of claim 1, wherein said copy partition is already encrypted and wherein said encrypted loopback filesystem in (d) re-encrypts said copy data.

6. An effectively in-place encryption computer system comprising computer-readable instructions stored in a non-transitory storage medium and at least one microprocessor coupled to said storage medium for executing said computer-readable instructions, said effectively in-place encryption computer system comprising:
  (a) a plurality of data partitions on one or more storage devices;
  (b) a first target partition and one or more copy partitions belonging to said plurality of data partitions, said one or more copy partitions having a collective free storage space large enough to store copy data of said first target partition;
  (c) one or more backing files created on corresponding said one or more copy partitions;
  (d) one or more encrypted loopback block devices created with corresponding said one or more backing files, wherein said one or more encrypted loopback block devices utilize corresponding one or more symmetric keys for encryption;
  (e) one or more physical volumes initialized from corresponding said one or more encrypted loopback block devices;
  (f) a volume group created on said one or more physical volumes;
  (g) a logical volume created on said volume group; and
  (h) an encrypted filesystem created on said logical volume;
wherein said encrypted filesystem temporarily stores said copy data while said copy data is being deleted from said first target partition and while said target partition is being encrypted, and wherein said copy data is restored back onto said first target partition after said first target partition has been encrypted.

7. The effectively in-place encryption computer system of claim 6, wherein said first target partition is included in a volume group created while encrypting a second target partition belonging to said plurality of said data partitions.

8. The effectively in-place encryption computer system of claim 6, wherein said copy data comprises one or both of root data and user data.

9. The effectively in-place encryption computer system of claim 6, wherein said one or more copy partitions are automatically identified by an analysis code that analyzes free disk space of said plurality of said data partitions.

10. A computer-implemented method executing by at least one microprocessor, computer-readable instructions stored in a non-transitory storage medium coupled to said at least one microprocessor, said method comprising the steps of:
  (a) configuring a plurality of data partitions on one or more storage devices, said plurality of data partitions including a target partition that is to be encrypted;
  (b) identifying a copy partition from amongst said plurality of data partitions excluding said target partition, said copy partition having a free storage space large enough to store copy data of said target partition;
  (c) creating a backing file on said copy partition;
  (d) creating an encrypted loopback filesystem with said backing file, said encrypted loopback filesystem utilizing a first symmetric key for encryption;
  (e) temporarily storing said copy data onto said encrypted loopback filesystem while deleting said copy data from said target partition and encrypting said target partition with a second symmetric key; and
  (f) restoring said copy data from said encrypted loopback filesystem onto said target partition after said target partition has been encrypted.

11. The computer-implemented method of claim 10 wherein said copy data comprises one or both of operating system (OS)-related and user-related data.

12. The computer-implemented method of claim 10 storing configuration data related to said target partition in an installation configuration file.

13. The computer-implemented method of claim 10 automatically identifying said copy partition by analyzing disk usage on said plurality of said data partitions.

14. The computer-implemented method of claim 10 compressing said copy data before performing said step (e).

15. The computer-implemented method of claim 10 manually designating said copy partition by an administrator.

16. A computer-implemented method executing by at least one microprocessor, computer-readable instructions stored in a non-transitory storage medium coupled to said at least one microprocessor, said method comprising the steps of:
  (a) configuring a plurality of data partitions on one or more storage devices, said plurality of data partitions comprising a first target partition that is to be encrypted;
  (b) identifying one or more copy partitions from amongst said plurality of data partitions excluding said first target partition, said one or more copy partitions having a combined free storage space large enough to store copy data of said first target partition;
  (c) creating one or more backing files on corresponding said one or more copy partitions;
  (d) creating one or more loopback devices using corresponding said one or more backing files;

(e) initializing each of said one or more loopback devices into respective one or more physical volumes;
(f) creating a volume group containing each of said one or more physical volumes;
(g) creating a logical volume over said volume group;
(h) encrypting said logical volume with a first symmetric encryption key to obtain an encrypted logical volume;
(i) creating a filesystem on said encrypted logical volume to obtain an encrypted filesystem;
(j) temporarily copying said copy data from said first target partition to said encrypted filesystem while encrypting said first target partition with a second symmetric key; and
(k) restoring said copy data from said encrypted filesystem onto said first target partition after said first target partition has been encrypted.

17. The computer-implemented method of claim 16 deleting said encrypted filesystem along with underlying encrypted logical volume, volume group, said one or more physical volumes, said one or more loopback devices and said one or more backing files, and forgetting said first encryption key after said step (k).

18. The computer-implemented method of claim 17 including said first target partition after it has been encrypted in said step (k) in a volume group for encrypting a second target partition from amongst said plurality of data partitions, in a subsequent iteration of said computer-implemented method.

19. The computer-implemented method of claim 16 authenticating to a key manager and requesting it to create said second symmetric key.

20. The computer-implemented method of claim 16 generating said first symmetric encryption key locally.

21. The computer-implemented method of claim 16 compressing said copy data before performing said step (j).

* * * * *